(12) United States Patent
Carleial et al.

(10) Patent No.: US 12,344,387 B2
(45) Date of Patent: Jul. 1, 2025

(54) SYSTEMS AND METHODS FOR LOW VOLTAGE WIRING FOR EVTOL AIRCRAFT

(71) Applicant: Archer Aviation Inc., San Jose, CA (US)

(72) Inventors: Pedro Roberto Paterson Carleial, Los Altos Hills, CA (US); Marco Da Silva, Montreal (CA); Daniel Kenji Nishimaru, Pointe-Claire (CA); Devesh Jain, North Billerica, MA (US)

(73) Assignee: ARCHER AVIATION INC., San Jose, CA (US)

( * ) Notice: Subject to any disclaimer, the term of this patent is extended or adjusted under 35 U.S.C. 154(b) by 69 days.

(21) Appl. No.: 18/312,231

(22) Filed: May 4, 2023

(65) Prior Publication Data

US 2024/0132222 A1 Apr. 25, 2024
US 2024/0228049 A9 Jul. 11, 2024

Related U.S. Application Data

(60) Provisional application No. 63/380,376, filed on Oct. 20, 2022.

(51) Int. Cl.
*B64D 41/00* (2006.01)
*B60L 58/21* (2019.01)
(Continued)

(52) U.S. Cl.
CPC .............. *B64D 27/24* (2013.01); *B60L 58/21* (2019.02); *B60L 2200/10* (2013.01); *B60L 2210/12* (2013.01)

(58) Field of Classification Search
CPC ...... B64D 27/24; B64D 27/357; B64D 27/34; B64D 35/021; B60L 58/21;
(Continued)

(56) References Cited

U.S. PATENT DOCUMENTS 8,738,268 B2 * 5/2014 Karimi ...................... H02J 3/38
700/286
9,413,162 B2 8/2016 Brouwer et al.
(Continued)

OTHER PUBLICATIONS

Swaminathan, N., "An Overview of High-Conversion High-Voltage DC-DC Converters for Electrified Aviation Power Distribution System", IEEE Transactions on Transportation Electrification, See http://www.ieee.org/publications_standards/publications/rights/index.html for more information, 15 pages.
(Continued)

*Primary Examiner* — Elim Ortiz
*Assistant Examiner* — Xuan Ly
(74) *Attorney, Agent, or Firm* — Finnegan, Henderson, Farabow, Garrett & Dunner, LLP

(57) ABSTRACT

In an embodiment, a system may comprise at least two power supplies which may comprise a first power source, a first step-down converter, a first switching device, a first bus, a second power source, a second step-down converter, a second switching device, and a second bus, the first and second buses being electrically separate. An exemplary system may further comprise an alternate power supply comprising a third power source and an alternate step-down converter connected to at least the first and second buses via at least a third switching device, the alternate power supply acting as a backup power supply configured to be used after a failure of one or more of the at least two power supplies.

(Continued)

In some embodiments, the first and second switching devices may be controlled by at least a first controller and the at least third switching device may be controlled by an alternate controller.

22 Claims, 11 Drawing Sheets

(51) Int. Cl.
*B64D 27/24* (2006.01)
*H02J 3/14* (2006.01)

(58) Field of Classification Search
CPC ............. B60L 2200/10; B60L 2210/12; B60L 3/0023; B60L 3/003; B60L 3/0061; B60L 3/0092
USPC .......................................................... 307/9.1
See application file for complete search history.

(56) References Cited

U.S. PATENT DOCUMENTS

| | | | |
|---|---|---|---|
| 10,525,915 | B2 | 1/2020 | Sturza et al. |
| 11,318,858 | B2 | 5/2022 | Zheng et al. |
| 2018/0029474 | A1 | 2/2018 | Berels et al. |
| 2018/0131192 | A1 | 5/2018 | Rozman et al. |
| 2019/0079548 | A1* | 3/2019 | Buffenbarger .... H02J 13/00002 |
| 2021/0167597 | A1 | 6/2021 | Gritsch |
| 2021/0391727 | A1 | 12/2021 | Devautour |
| 2022/0185127 | A1 | 6/2022 | Singer et al. |
| 2022/0190705 | A1 | 6/2022 | Miller et al. |
| 2022/0282635 | A1 | 9/2022 | Bruce |
| 2022/0302845 | A1* | 9/2022 | Pascuzzi ................. H02J 9/062 |

OTHER PUBLICATIONS

Wang, C., et al., "Suppression of First Side-Band Switching Harmonics Using DC-DC converters with an Advanced Modulation Scheme", IEEE Transactions on Transportation Electrification, 9 pages.

Buticchi, G., "On-board Microgrids for the More Electric Aircraft—Technology Review", IEEE Transactions on Industrial Electronics, See http://www.ieee.org/publications_standards/publications/rights/index.html for more information, 12 pages.

Wang, X., et al., "Optimal Power Flow Based Architecture Design for Electrical Power System in More-Electric Aircraft", The Department of Electrical and Electronic Engineering; School of Computer Science University Of Nottingham, Nottingham, United Kingdom, 6 pages.

Chen, G., et al., "Topology-Reconfigurable Fault-Tolerant LLC Converter with High Reliability and Low Cost for More Electric Aircraft", IEEE Transactions on Power Electronics, See http://www.ieee.org/publications_standards/publications/rights/index.html for more information, 13 pages.

* cited by examiner

SYSTEMS AND METHODS FOR LOW VOLTAGE WIRING FOR EVTOL AIRCRAFT

CROSS-REFERENCE TO RELATED APPLICATIONS

This application claims priority to Provisional U.S. Patent Application No. 63/380,376, filed Oct. 20, 2022, which is incorporated by reference herein in its entirety.

TECHNICAL FIELD

This disclosure relates generally to the field of powered aerial vehicles. More particularly, and without limitation, the present disclosure relates to innovations in tilt-motor aircraft that use electrical propulsion systems. Certain aspects of the present disclosure generally relate to power distribution systems for powered aerial vehicles. Other aspects of the present disclosure generally relate to improvements in power distribution systems that may be used in other types of vehicles but provide particular advantages in aerial vehicles.

BACKGROUND

Extant power distribution systems comprise low-voltage DC buses which are interconnected such that, when a power source failure occurs, power to the buses is maintained and the components utilizing the buses remain powered. Such extant power distribution solutions, however, allow for propagation of noise, overloads, and other electrical disturbances across two or more buses and/or power sources.

Furthermore, extant power distribution systems comprising low-voltage DC buses each have a primary power source and a backup power source, such as, e.g., a low-voltage battery. Therefore, extant power distribution solutions require extra weight and increased maintenance at least due to the primary and backup power source required for each low-voltage DC bus.

SUMMARY

Some disclosed embodiments involve a power distribution system for an aircraft. In some embodiments, a power distribution system for an aircraft may comprise at least two power supplies. In some embodiments, at least two power supplies may comprise a first power source connected to a first step-down converter, the first step-down converter being connected via a first switching device to a first bus, and a second power source connected to a second step-down converter, the second step-down converter being connected via a second switching device to a second bus, the second bus being electrically separate from the first bus. In some embodiments, a power distribution system for an aircraft may further comprise an alternate power supply comprising a third power source connected to an alternate step-down converter, the alternate step-down converter being connected to each of at least the first and second buses via at least a third switching device, the alternate power supply acting as a backup power supply configured to be used after a failure of one or more of the at least two power supplies. In some embodiments, the first and second switching devices are controlled by at least a first controller. In some embodiments, the at least third switching device is controlled by an alternate controller.

Consistent with some disclosed embodiments, a system may be configured to provide alternate power from the alternate power supply within 200 milliseconds after a component of the at least two power supplies fails. In some embodiments, a system may be configured to provide alternate power from the alternate power supply within 100 milliseconds after a component of the at least two power supplies fails. In some embodiments, a system may be configured to provide alternate power from the alternate power supply within 50 milliseconds after a component of the at least two power supplies fails.

In some embodiments, the first bus and the second bus may be configured to receive power via the at least third switching device from the alternate power supply after a failure of a component of a channel corresponding to at least one of the first power source or the second power source.

Consistent with some disclosed embodiments, each one of the first, second, and at least third switching devices may have a conducting state and a non-conducting state, and the at least first controller and the alternate controller may be configured to cause transitions within each of the first, second, and at least third switching devices between their conducting states and their non-conducting states to thereby cause each of the first, second, and alternate power supplies to provide power to each of the first and second buses in different arrangements.

In some embodiments, the first, second, and at least third switching devices may be configured such that each of the first, second, and alternate step-down converters are electrically separate or electrically separable. In some embodiments, the first, second, and alternate power sources may be high voltage power sources. In some embodiments, the first, second, and alternate step-down converters may be high voltage to low voltage converters. In some embodiments, the first, second, and alternate step-down converters may be DC-DC converters.

According to some disclosed embodiments, the first and second buses may be configured to be interconnectable. In some embodiments, the first and second switching devices may be configured to disconnect a failing component of a channel corresponding to at least one of the first power source or the second power source from the first bus and/or the second bus.

Consistent with some disclosed embodiments, the first switching network may be controlled by the at least first controller and the second switching network may be controlled by at least a second controller. In some embodiments, the at least third switching device may include two or more switching devices forming an alternate switching network.

According to some disclosed embodiments, the third power source may be one of the first power source or the second power source. In some embodiments, the first, second, and third power sources may be the same power source.

In some embodiments, the first, second, and alternate step-down converters may operate in an absence of a low voltage battery. In some embodiments, the at least first controller may operate based on hardwire logic. In some embodiments, the alternate controller may operate based on conditional logic.

Some disclosed embodiments involve a method for distributing power in an aircraft. In Some embodiments, a method comprises providing at least two power supplies, the at least two power supplies comprising a first power source connected to a first step-down converter, the first step-down converter being connected via a first switching device to a first bus, and a second power source connected to a second step-down converter, the second step-down converter being connected via a second switching device to a second bus, the second bus being electrically separate from the first bus. In some embodiments, a method further comprises providing an alternate power supply comprising a third power source connected to an alternate step-down converter, the alternate step-down converter being connected to each of at least the first and second buses via at least a third switching device, the alternate power supply acting as a backup power supply configured to be used after a failure of one or more of the at least two power supplies. In some embodiments, a method further comprises controlling the first and second switching devices by at least a first controller. Further, in some embodiments, a method may comprise controlling the at least third switching device by an alternate controller.

DETAILED DESCRIPTION

Figure 1:
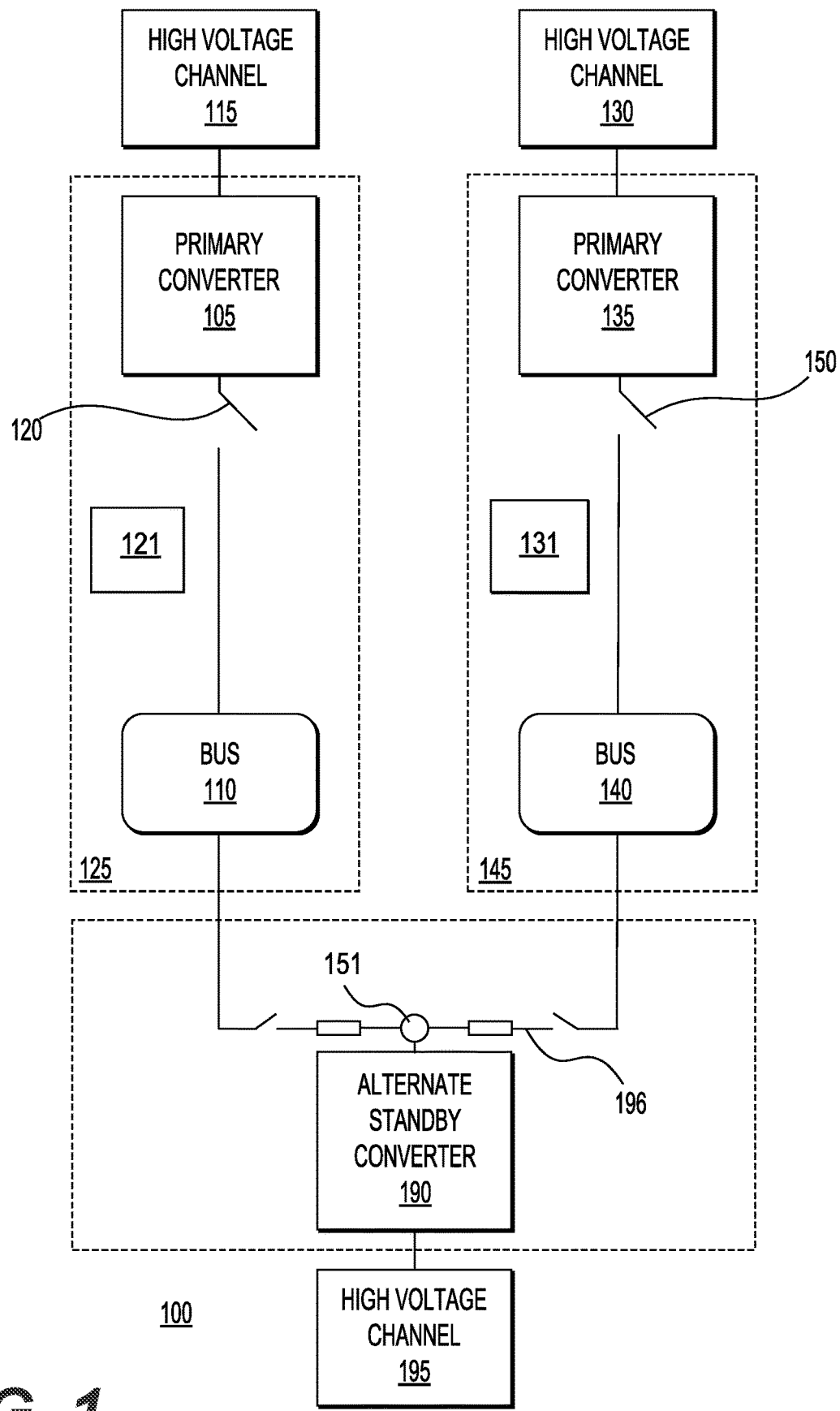
FIG. 1 shows an exemplary power distribution system, consistent with disclosed embodiments.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence nor constrained to a particular system configuration. Additionally, some of the described embodiments or elements thereof can occur or be performed (e.g., executed) simultaneously, at the same point in time, or concurrently. Reference will now be made in detail to the disclosed embodiments, examples of which are illustrated in the accompanying drawings.

It is to be understood that both the foregoing general description and the following detailed description are exemplary and explanatory only and are not restrictive of this disclosure. The accompanying drawings, which are incorporated in and constitute a part of this specification, illustrate several exemplary embodiments and together with the description, serve to outline principles of the exemplary embodiments.

This disclosure addresses at least the problems described above by configuring one or more switching networks such that the buses remain electrically separate after any single initial failure of a power distribution system component, including but not limited to the failure of a primary power conversion device (e.g., a converter). A switching network, as used herein, is defined as at least one switching device. The terms "conversion device" and "converter" are used interchangeably throughout this disclosure.

This disclosure further addresses such problems by providing an alternate/backup power source that is configured to be connectable to all the low-voltage buses via a switching network.

eVTOL (i.e., electric vertical takeoff and landing) aircraft particularly benefit from the methods and systems disclosed herein because they require electric power for all flight and engine control. Thus, for eVTOL aircraft, the need for high-availability electric power is particularly important.

Conventional aircraft may have other power sources, such as, e.g., a combustion engine. Conventional aircraft also often comprise flight control systems which may be independent from electric or electronic equipment, such as, e.g., mechanical controls. Furthermore, conventional aircraft which utilize flight control systems with electric or electronic flight controls often also require an emergency power source, such as, e.g., an air-driven generator.

eVTOL aircraft which utilize the systems and methods disclosed herein may benefit due to (1) high redundancy electric power with minimal equipment, (2) an absence of a need for a dedicated alternate high-voltage battery, a dedicated alternate power converter, and/or a dedicated low-voltage battery for each bus, and (3) an absence of a need for an air-driven generator or other emergency power source.

In some embodiments, a power distribution system as described herein may comprise a system (or method) for providing high-availability low-voltage power to an aircraft, the power distribution system providing a resultant safety margin significantly higher than currently achievable with requirements based on comparable weight and quantity of equipment. "Low-voltage," as used herein, refers to 33 volts or lower. For example, a low voltage power distribution system may be responsible for converting high voltage energy from one or more main battery systems, via one or more step-down power converters, into a 28 VDC network which, in turn, may be used to distribute electrical power to low voltage loads of an aircraft. In some embodiments, the system (or method) comprises (providing) two or more high-voltage power source(s), each connected via separate means (i.e., wherein the high-voltage power sources are not interconnected) to a separate primary power conversion device (i.e., power converter) which causes the high-voltage power to be converted to low-voltage direct current (DC) output. It will be understood that, as such, the primary power converter may be a step-down power converter. "High-voltage," as used herein, refers to a voltage greater than 110 volts. "Low-voltage direct current (DC)," as used herein, refers to 33 VDC or lower. For example, two or more primary and one alternate DC-DC converter(s) may perform the voltage conversion while the power may be managed and distributed through two or more primary power distribution boxes (PDBs) and two or more secondary power distribution assemblies (SPDAs).

In exemplary embodiments, a low voltage power distribution system may convert high voltage energy into regulated low voltage power to feed all aircraft low voltage loads. For example, the two or more primary step-down converters of the system may provide primary power to the power distribution boxes which, in turn, distribute the primary power among two or more buses. As another example, the alternate converter may act as an alternate step-down converter and thereby an alternate power source and may supply low voltage power during, e.g., power up of an aircraft and/or in the event of a failure of one or more primary converters. In some embodiments, the alternate converter may be connected to at least one primary channel. In some embodiments, at least one battery may be connected to at least one bus, wherein the at least one battery provides backup power to the at least one bus. As another example, the PDBs and SPDAs may distribute low voltage electrical power to all low voltage system loads. As yet another example, the return lines of the low voltage system may be routed among and along the PDBs, SPDAs, and converters. Further, other aircraft system return lines may be routed back to one or more PDBs.

In other exemplary embodiments, a low voltage power distribution system may provide low voltage electrical power protections, such as identifying operating conditions outside the allowed power quality and capacity envelopes for which the system is designed and taking the necessary actions to remove such conditions. For example, the system may protect against power supply overvoltage by, e.g., continuously monitoring an output voltage to detect any overvoltage and thereby protect the system against overvoltage conditions. As another example, the system may protect against power supply undervoltage by, e.g., continuously monitoring an output voltage to detect any undervoltage and thereby protect the system against undervoltage conditions. As another example, the system may protect against power supply overcurrent by, e.g., continuously monitoring an output current to detect and remove any overcurrent circulating through the system, based on predefined settings. As yet another example, the system may protect against power supply overload by, e.g., continuously monitoring a used capacity to detect and remove overload conditions, based on predefined settings. As a further example, the system may protect against power supply overtemperature by, e.g., continuously monitoring an internal temperature to detect and report any overtemperature condition. As yet a further example, the system may protect against power distribution overcurrent by, e.g., having each PDB and SPDA supply power to low voltage loads through circuit protective devices which are capable of detecting and removing overcurrent conditions based on, e.g., tripping curves.

In yet other exemplary embodiments, a low voltage power distribution system may provide system control, including control of subsystem states, lighting items, circuit protective devices, and power source recovery. For example, the system may provide control of system and subsystem states. As another example, the system may provide operational control of electronic circuit breakers by, e.g., allowing, via an interface with flight deck avionics (FDA), for automatic or manual control of the state of one or more solid state power controllers (SSPCs) present in the SPDAs. As yet another example, the system may provide a capability to reset failed power sources by, e.g., sending a reset signal to a faulty power source when commanded by a user of the aircraft activating a reset switch via a flight deck control panel.

In some exemplary embodiments, a low voltage power distribution system may determine a system status by, e.g., detecting and reporting its status to the FDA. For example, the system may gather a general system status from one or more components and report the general status to the FDA.

In other exemplary embodiments, a low voltage power distribution system may detect and report system faults. For example, the system may perform built-in testing (BIT) to monitor for and detect failures and report detected failures to the flight deck (e.g., FDA) for corrective action, maintenance, and/or pilot awareness. As another example, the system may monitor for and detect low voltage power system faults and report detected faults to the flight deck (e.g., FDA) for corrective action, maintenance, and/or pilot awareness.

In some exemplary embodiments, a low voltage power distribution system may support system maintenance by, e.g., enabling software maintenance and/or providing an interface for maintenance equipment to perform system maintenance tasks. For example, the system may provide built-in testing equipment (BITE) to facilitate maintenance identification of failing components. As another example, the system may provide on wing capability to set rates of electronic breakers by, e.g., configuring the rate of one or more SSPCs using a software package. As yet another example, the system may support software configuration reporting via, e.g., a communication protocol to the flight deck. As another example, the system may support on wing software upload by, e.g., providing field-loadable SPDA software.

In some embodiments, each of the separate primary power conversion devices are in turn connected, via separate switching networks, to electrically separate low-voltage buses (i.e., wherein the low-voltage buses are not interconnected, or wherein the low-voltage buses are electrically separable). Thus, there may be at least two high-voltage power sources, at least two primary power conversion devices, at least two switching networks, and at least two 2 low-voltage buses. The two or more separate (or separable) buses may each be connected, via separate channels, to a separate high-voltage power source via the at least two primary power conversion devices. Furthermore, the capability to configure the absence of interconnections between the channels avoids any propagation of issues from one bus to another after any given failure on any one given channel.

In some embodiments, one of the high-voltage power sources, or alternatively a different high-voltage power source, is connected to an alternate power conversion device, which acts as a backup power source for any (or all) of the buses. In some embodiments, each primary channel (e.g., a primary power source and primary step-down power converter) may have a corresponding separate alternate channel (e.g., an alternate power source and/or an alternate step-down converter for each primary channel). In other embodiments, at least one alternate channel may provide backup power to all primary channels. In some embodiments, at least one bus may be connected to a low voltage battery which is configured to provide backup power via at least one switching device, if needed. In other embodiments, two or more buses may be connected to a third bus via switching devices, and the third bus may be connected to a low voltage battery via a switching device, wherein the low voltage battery is configured to provide backup power, if needed. In some embodiments, the third bus may be connected to one of the two or more buses. In some embodiments, the third bus may further be connected to either a low-voltage battery configured to provide backup power via a switching device, an alternate power supply (e.g., an alternate power converter and optionally an alternate power source) as described herein, or both. In some embodiments, the alternate conversion device may be connected to each of the two or more buses via one or more additional separate switching networks. In some embodiments, the switching networks connected to each respective bus (from their primary power conversion device and/or from the alternate power conversion device) may be controlled by a controller based on logic that involves determining one or more failing primary power conversion devices, one or more primary power sources, or any other component of one or more primary power supplies. In some embodiments, the primary power conversion devices and their respective switching network(s) may be controlled by a first, or primary, controller based on, e.g., hardwire logic including wires and/or relays, and the alternate power conversion device and its switching network(s) may be controlled by a second, or alternate, controller based on, e.g., conditional logic software or electronics. In some embodiments, each primary power conversion device and respective switching network may be controlled by separate primary controllers based on, e.g., simple, hardwire logic. In some embodiments, the alternate power conversion device and its switching network(s) may be separately controlled by one or more individual controllers based on, e.g., hardwire logic or conditional logic. Hardwire logic may suffice for the primary controller(s), because a primary controller must simply be programmed to cause a corresponding switching network to open upon a detected failure thereby disconnecting the failing component from the rest of the system. For example, a primary controller may include relays and contactors, splices, a programmable logic device, or a field programmable gate array (FPGA). Alternate controller(s), however, may require more complex logic, such as conditional logic (e.g., implemented via conditional logic software or electronics) due to the various potential failures that can occur along any one of the primary power channels and the various connections/switching networks which must be opened and/or closed to provide alternate power and disconnect one or more failing components as a result of detection of at least one failure.

In exemplary embodiments, two or more primary DC-DC power converters may be responsible for providing power to two or more 28 VDC buses during normal operation. Each of the two or more primary power converters may receive high voltage power from a one or a specific pair of high voltage batteries and convert it to a regulated lower voltage (e.g., 28 VDC) level to supply the loads connected to one of the two or more electrical busbars. In some embodiments, each primary converter may have a nominal power capacity of, e.g., 2.0 kW (71 A @ 28 VDC) and may supply up to 150% and 200% of its nominal rating for 2 minutes and 5 seconds, respectively.

In exemplary embodiments, at least an alternate DC-DC power converter may be responsible for the initial power up of the LVPS and/or for providing backup power to any two buses in case of failure of any one of the primary DC-DC power converters. In some embodiments, this alternate power converter may also be powered by one or a pair of high voltage batteries and may provide regulated 28 VDC power output. In some embodiments, the alternate power converter may have a nominal power capacity of, e.g., 2.8 kW (100 A @ 28 VDC) and may supply up to 150% and 200% of its nominal rating for 2 minutes and 5 seconds, respectively.

In exemplary embodiments, two or more primary power distribution boxes (PDBs) may receive low voltage power, each from a primary DC-DC power converter, and may distribute it to the aircraft loads through two or more independent and physically segregated busbars (e.g., one in each box). In some embodiments, these boxes also may house the system's power distribution contactors, relays, and thermal circuit breakers (TCBs). In some embodiments, each box may have provisions to accommodate, e.g., 25 TCBs.

In exemplary embodiments, along with the PDBs, two or more Secondary Power Distribution Assemblies (SPDAs) may also be used to distribute power to low voltage loads. In some embodiments, feeders coming from the PDBs may provide power to the SPDAs which may further distribute it to aircraft loads through solid state power controllers (SSPCs). In some embodiments, monitoring and control of the SSPCs may be performed through the interface with the FDA system. In some embodiments, each SPDA may contain 24 SSPCs with current ratings varying from, e.g., 5 to 15 amperes.

In exemplary embodiments, each of the two or more independent primary power distribution channels may be connected to three segregated pairs of high voltage batteries (e.g., CH1//CH4, CH2//CH5, CH3//CH6). In some embodiments, the alternate power converter (ALT DCDC) may be connected to the same high voltage pair of batteries as one of the primary power converters. In some embodiments, the primary power distribution channels may operate isolated from each other during normal operation and under single failure conditions.

In some embodiments, hardware components such as contactors, relays, and busbars may be installed inside the power distribution box of each power distribution channel. In some embodiments, the primary power contactors (PPCL, PPCR and PPCC) may be commanded by hardwired logic, while the alternate power contactors (APCL, APCR and APCC) may be commanded by the alternate controller (ALT CONTR).

In some embodiments, the alternate controller may interface with the FDA system through ARINC 429 and with the primary and alternate converters through CAN BUS. In some embodiments, ARINC 429 may also be used for communication between FDA and the SPDAs, through which SSPCs can be monitored and commanded from the flight deck. In some embodiments, besides CAN BUS, the alternate power converter may also send discrete fault signals to the alternate controller. In some embodiments, low power command signals may flow from the alternate controller to the PDBs for control of alternate power contactors (APCs).

In some embodiments, discrete signals may also be the communication link between the primary power distribution boxes and their associated primary power converters and from the PDBs to the alternate controller and alternate power converter.

In some embodiments, the alternate controller may read the bus voltage from each PDB and the reset relays may receive redundant power from different busbars to make their activation possible when an associated busbar is powered off.

In some embodiments, the aircraft mode and DC-DC reset switches may provide discrete signals to the power distribution boxes, while the Flight Control System may send discrete signals to the PDBs and the alternate controller.

In some embodiments, high voltage lines (positive and negative) may run from the high voltage batteries to the power converters. In some embodiments, low voltage lines (positive and negative) may connect the power converters and the PDBs. In some embodiments, SPDAs may be connected to corresponding buses through dedicated feeders.

In exemplary embodiments, the LVPS may interface with a high voltage system which may be responsible for providing power to the LVPS. In some embodiments, this power may be supplied by one, two, three, or more high voltage power channels. For example, a first high voltage power system (HVPS) channel may be responsible for providing power to a first primary power converter. The interface between the first HVPS channel and the LVPS may include a pair of cables (positive and negative) connecting the HVPS channel to the first primary power converter. As a further example, second and third HVPS channels may be similarly connected to, e.g., a second primary converter and an alternate power converter, respectively. In some embodiments, two or more HVPS channels may be interconnected at the HVPS side.

In exemplary embodiments, a Flight Deck Control Panel may provide command signals so the LVPS can automatically configure itself to the desired operational state and/or recover from a failure in the power conversion system. For example, an aircraft mode switch may provide indication of the required operational state (e.g., "OFF"/"STBY"/"GND"/ "FLY") to the power distribution boxes through a discrete open/ground signal. As another example, a DC-DC converters reset switch may inform the DC-DC converters reset command to the power distribution boxes through a discrete open/ground signal.

In exemplary embodiments, a Flight Control System (FCS) may be responsible for determining when an aircraft is on the ground and stationary, and for sending this information to the LVPS. For example, a discrete open/ground signal may be sent by a FCS to indicate when the aircraft is on the ground and not moving. In some embodiments, this signal may be used by the LVPS to prevent all power converters from shutting down in the air in case of a failure or erroneous command of the aircraft mode switch.

In exemplary embodiments, all loads of the LVPS connected to any one of the busbars may be powered at regulated voltage levels by the power converters and may further have their circuits protected by circuit protective devices. For example, LVPS loads powered by TCBs may be directly connected to the power distribution boxes and may have their circuits protected according to the thermal circuit breaker tripping curves. As another example, LVPS loads powered by SSPCs may be connected to the SPDA modules and may have their circuits protected by solid state power controllers providing equivalent protection functions, through software, of the TCBs.

In exemplary embodiments, any interfaces between the LVPS and FDA may be performed through communication protocols. In some embodiments, data transfer necessary to trigger and display messages, status, and warnings, as well as monitoring and control of SSPCs, may be performed through such interfaces. As an example, communication may be established through ARINC 429. In some embodiments, voltage, current, load measurements, contactors' status, and detected fault/fail signals may be passed from the alternate controller to FDA. As another example, SPDAs may be connected to FDA through an ARINC 429 network. In some embodiments, information about the status of the SSPCs may be passed from the SPDAs to FDA, while control signals may be processed in FDA and sent to the SPDAs to command the SSPCs.

In exemplary embodiments, modes of operation of the LVPS may be related to the aircraft modes, and either may be commanded by an aircraft mode switch. For example, an aircraft powered down configuration may represent the LVPS when the aircraft mode switch is at an "OFF" position. In some embodiments, during this condition, no power may be available from the high voltage batteries to the DC-DC converters, all power contactors may be open, and the system may be considered completely unpowered. As another example, an aircraft standby configuration may represent a point when the high voltage batteries may start providing power to the LVPS converters. In some embodiments, no low voltage power may be available if none of the converters have received an enable signal. In some embodiments, during this configuration, although the converters may already be receiving high voltage power, the system contactors may still be kept open and all low voltage busbars may remain unpowered. As yet another example, low voltage power up may start when the aircraft mode switch is moved to a ground ("GND") position. In some embodiments, at this moment, the alternate converter may receive an enable signal and may start providing regulated low voltage power through its output. In some embodiments, an alternate controller may sequentially command the alternate power contactors to close, so the low voltage electrical buses may start powering up, as fed by the alternate converter. In some embodiments, the alternate converter may be the only converter powering all buses during this operation mode. In some embodiments, this may be performed to check the alternate converter's operation and availability during each power up sequence.

As a further example, when the aircraft mode switch is moved to a fly ("FLY") position, the primary converters may also receive an enable signal and may start their internal initialization sequence. In some embodiments, the primary power contactors may be commanded to close by one or more primary controllers. In some embodiments, during a few milliseconds, all converters may be paralleled through the alternate power contactors. In some embodiments, after the system has stabilized, the primary power contactors may be sequentially opened, thereby disconnecting the alternate converter from the busbars and allowing the three power distribution channels to operate independently and isolated from each other. In some embodiments, the alternate converter may be kept enabled and ready to power any two busbars in case of failures. In some embodiments, the LVPS may then assume its normal operation configuration. In some embodiments, this configuration may be kept throughout the whole flight until the aircraft is ready for a powering down sequence.

Upon a determination of a failing primary power conversion device, the combination of switching networks may be configured, via the primary and alternate controllers, such that certain switches comprising the combination of switching networks open and/or close to provide proper electrical connections such that alternate power from the alternate power conversion device is provided to the two or more buses while simultaneously cutting off the failing primary power conversion device. Some embodiments may include one or more low-voltage batteries that can be connected to one or more of the buses permanently or, alternatively, via additional switching networks.

In some embodiments, the alternate power conversion device acts as an alternate power source for any single bus of the two or more buses without causing any of the buses to become interconnected via the logic implemented by the controller(s) of the switching networks. In some embodiments, the alternate power conversion device may be configured to act as an alternate power source for two or more buses, particularly in the case where multiple primary power conversion devices fail. In such cases, the switching networks may cause the two or more buses to become interconnected, allowing the alternate power conversion device to simultaneously power at least two of the buses. In some embodiments, the alternate conversion device may be connected any of the two or more buses, thereby removing the prior art requirement of having separate alternate power supplies for each bus to ensure high availability. As a result, in some embodiments, the weight of the aircraft may also be reduced significantly. In some embodiments, the architecture of the switching networks is utilized to provide power to a corresponding bus via the alternate power conversion device. In some embodiments, the controller(s) used to control the switching networks may be configured to prevent connection of the alternate power conversion device to a bus when a short circuit failure is detected on that bus, thereby preventing a condition where a bus short circuit failure causes both the primary power conversion device and the alternate power conversion device to become inoperable due, e.g., to overcurrent. In some embodiments, this solution maintains a capability of the alternate power conversion device to be available to be used as an alternate power source for any other bus(es) following a short circuit on a given bus.

For example, should any one primary converter fail during flight, the alternate controller may promptly command the alternate power contactor of the failed power distribution channel to close. In some embodiments, this may bring back the power to the affected busbar after a brief power interruption caused by the failure. In some embodiments, the other one or more busbars may not experience any interruption as all two or more channels may still operate segregated from each other. In some embodiments, the alternate converter may have enough capacity to power all loads connected to the failed channel.

As another example, in case two primary converters fail during flight, the alternate controller, similar to the one converter fail scenario, may command the alternate power contactors of the failed distribution channels to close. In some embodiments, the alternate converter, therefore, may power the two busbars from the failed channels. In some embodiments, no load shed may be necessary as the alternate converter capacity may be enough to power all loads from these two busbars. In some embodiments, in this configuration, one power distribution channel may be kept segregated from the other one or more busbars, which may be powered by the same converter.

As yet another example, and in the unlikely event that three or more primary power converters fail during flight, the alternate controller combined with hardwired logic may only command to close the alternate power contactors of the first two failed channels. In some embodiments, this logic may be necessary as the alternate converter may not be capable of powering all three buses during flight. In some embodiments, the busbar of the last channel to fail may remain unpowered, but all critical loads required for continued safe flight and landing may be kept powered by the remaining two busbars supplied by the alternate converter. In some embodiments, additionally, as one of the busbars may be kept de-energized as a result of this failure condition, a reset of the failed converters may be allowed and made possible through a reset ("DC/DC RST") switch. In some embodiments, should the reset attempt be successful, the recovered primary converter(s) may reconnect to the system and may re-establish power to its associated busbar.

As a further example, a busbar short-circuit may be handled differently from a converter failure by the LVPS. In some embodiments, as the short-circuit may usually be permanent and may damage other power sources connected to it, the alternate controller, associated with a failure indication from the primary converter of the affected channel, may determine whether the failure was caused by a short-circuit or not. In some embodiments, if the short-circuit is confirmed, the alternate controller may prevent the associated alternate power contactor from closing, therefore avoiding any damage to the alternate converter. In some embodiments, the bus short-circuit event may also lead to loss of one busbar, but all critical loads required for continued safe flight and landing may be kept powered by the remaining two power distribution channels unaffected by the event.

As a result, the power distribution system may provide at least single channel systems, as well as double channel systems, triple channel systems, and so on. As a further result, the power distribution system removes the need for aircraft diversion under at least single failure conditions, minimizes power feeders voltage drop, minimizes a likelihood of power interruptions simultaneously affecting multiple buses, minimizes a need to utilize double power feeders to supply user systems, provides at least three electrically and physically independent channels under both normal operation and single failure conditions, minimizes cascading failures due to channel independence, and minimizes the loads required.

Now turning to the Figures, FIG. 1 illustrates an exemplary power distribution system 100, consistent with disclosed embodiments. As shown in FIG. 1, in some embodiments, the disclosed power distribution system 100 may comprise a first high voltage channel 115 connected to a first primary conversion device (e.g., primary converter) 105 which is in turn connected via a first switching network 120 to a first bus 110. As further shown in FIG. 1, the power distribution system 100 may further comprise a second high voltage channel 130 connected to a second primary conversion device (e.g., primary converter) 135 which is in turn connected via a second switching network 150 to a second bus 140. As further shown in FIG. 1, the power distribution system 100 may further comprise a third high voltage channel 195 connected to an alternate/standby power conversion device (e.g., alternate standby converter) 190 (conversion device and converter are used interchangeably throughout this disclosure) which is in turn connected via a third switching network 196 to both the first bus 110 and the second bus 140. As further shown in FIG. 1, a first power distribution block 125 may comprise at least the first switching network 120 and the first bus 110, and a second power distribution block 145 may comprise at least the second switching network 150 and the second bus 140. As further shown in FIG. 1, a first controller 121 may control the first switching network 120, a second controller 131 may control the second switching network 150, and an alternate controller 151 may control the third switching network 196. The third switching network 196 may include a first portion corresponding to the first power distribution block 125 and a second portion corresponding to the second power distribution block 145. The first and second portions of the third switching network may each be controlled by the alternate controller 151.

Figure 2:
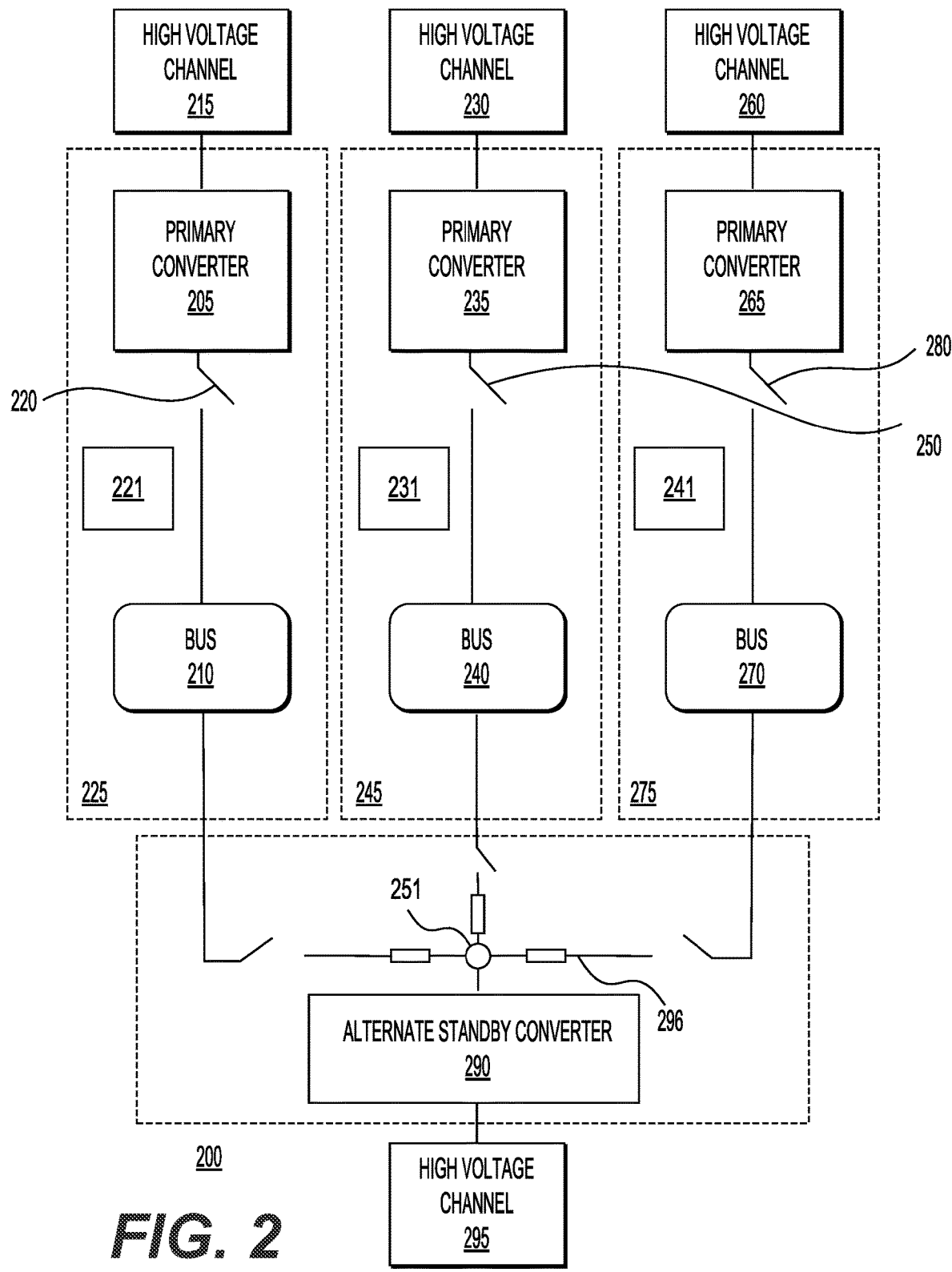
FIG. 2 shows another exemplary power distribution system, consistent with disclosed embodiments.

FIG. 2 shows another exemplary power distribution system 200, consistent with disclosed embodiments. As shown in FIG. 2, in some embodiments, the disclosed power distribution system 200 may comprise a first high voltage channel 215 connected to a first primary conversion device (e.g., primary converter) 205 which is in turn connected via a first switching network 220 to a first bus 210. As further shown in FIG. 2, the power distribution system 200 may further comprise a second high voltage channel 230 connected to a second primary conversion device (e.g., primary converter) 235 which is in turn connected via a second switching network 250 to a second bus 240. As further shown in FIG. 2, the power distribution system 200 may further comprise a third high voltage channel 260 connected to a third primary conversion device (e.g., primary converter) 265 which is in turn connected via a third switching network 280 to a third bus 270. As further shown in FIG. 2, the power distribution system 200 may further comprise a fourth high voltage channel 295 connected to an alternate/standby conversion device (e.g., alternate standby converter) 290 which is in turn connected via a fourth switching network 296 to each of buses 210, 240, and 270. As further shown in FIG. 2, a first power distribution block 225 may comprise at least the first switching network 220 and the first bus 210, a second power distribution block 245 may comprise at least the second switching network 250 and the second bus 240, and a third power distribution block 275 may comprise at least the third switching network 280 and the third bus 270. As further shown in FIG. 2, a first controller 221 may control the first switching network 220, a second controller 231 may control the second switching network 250, a third controller 241 may control the third switching network 280, and an alternate controller 251 may control the fourth switching network 296. The fourth switching network 296 may include a first portion corresponding to the first power distribution block 225, a second portion corresponding to the second power distribution block 245, and a third portion corresponding to the third power distribution block 275. The first, second, and third portions of the fourth switching network 296 may each be controlled by the alternate controller 251.

Figure 3:
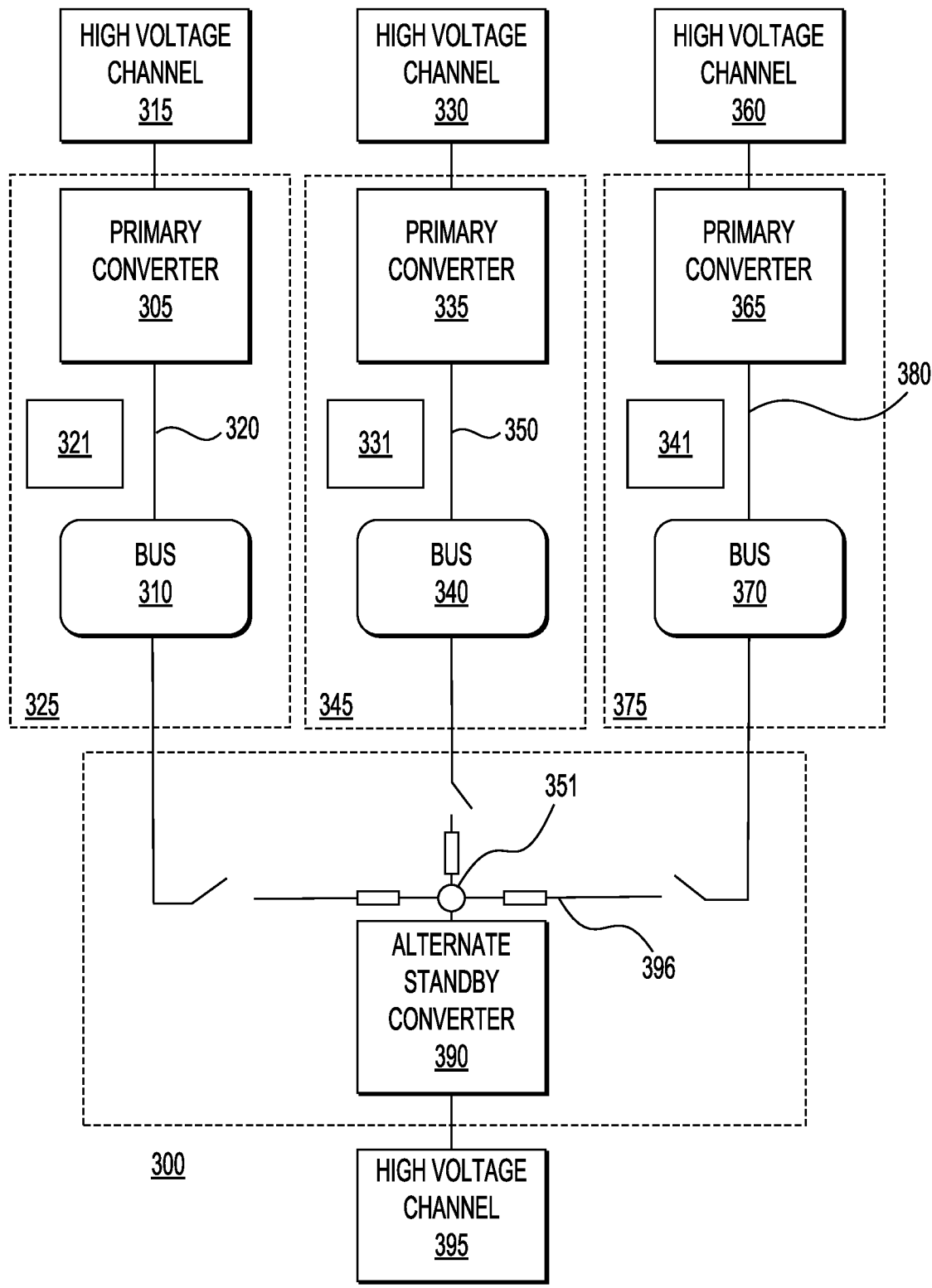
FIG. 3 shows an exemplary mode of an exemplary power distribution system, consistent with disclosed embodiments.

FIG. 3 shows an exemplary mode of an exemplary power distribution system 300, consistent with disclosed embodiments. As shown in FIG. 3, in some embodiments, the disclosed power distribution system 300 may comprise a first high voltage channel 315 connected to a first primary conversion device (e.g., primary converter) 305 which is in turn connected via a first switching network 320 to a first bus 310. As further shown in FIG. 3, the power distribution system 300 may further comprise a second high voltage channel 330 connected to a second primary conversion device (e.g., primary converter) 335 which is in turn connected via a second switching network 350 to a second bus 340. As further shown in FIG. 3, the power distribution system 300 may further comprise a third high voltage channel 360 connected to a third primary conversion device (e.g., primary converter) 365 which is in turn connected via a third switching network 380 to a third bus 370. As further shown in FIG. 3, the power distribution system 300 may further comprise a fourth high voltage channel 395 connected to an alternate/standby conversion device (e.g., alternate standby converter) 390 which is in turn connected via a fourth switching network 396 to each of buses 310, 340, and 370. As further shown in FIG. 3, a first power distribution block 325 may comprise at least the first switching network 320 and the first bus 310, a second power distribution block 345 may comprise at least the second switching network 350 and the second bus 340, and a third power distribution block 375 may comprise at least the third switching network 380 and the third bus 370. As further shown in FIG. 3, the first, second, and third switching networks 320, 350, and 380 may be configured such that all three primary power conversion devices 305, 335, and 365 are separately and electrically connected to each of their respective buses 310, 340, and 370, and the fourth switching network 396 may be configured such that the alternate power conversion device 390 is not electrically connected to any of buses 310, 340, or 370. As further shown in FIG. 3, a first controller 321 may control the first switching network 320, a second controller 331 may control the second switching network 350, a third controller 341 may control the third switching network 380, and an alternate controller 351 may control the fourth switching network 396. The fourth switching network 396 may include a first portion corresponding to the first power distribution block 325, a second portion corresponding to the second power distribution block 345, and a third portion corresponding to the third power distribution block 375. The first, second, and third portions of the fourth switching network 396 may each be controlled by the alternate controller 351.

Figure 4:
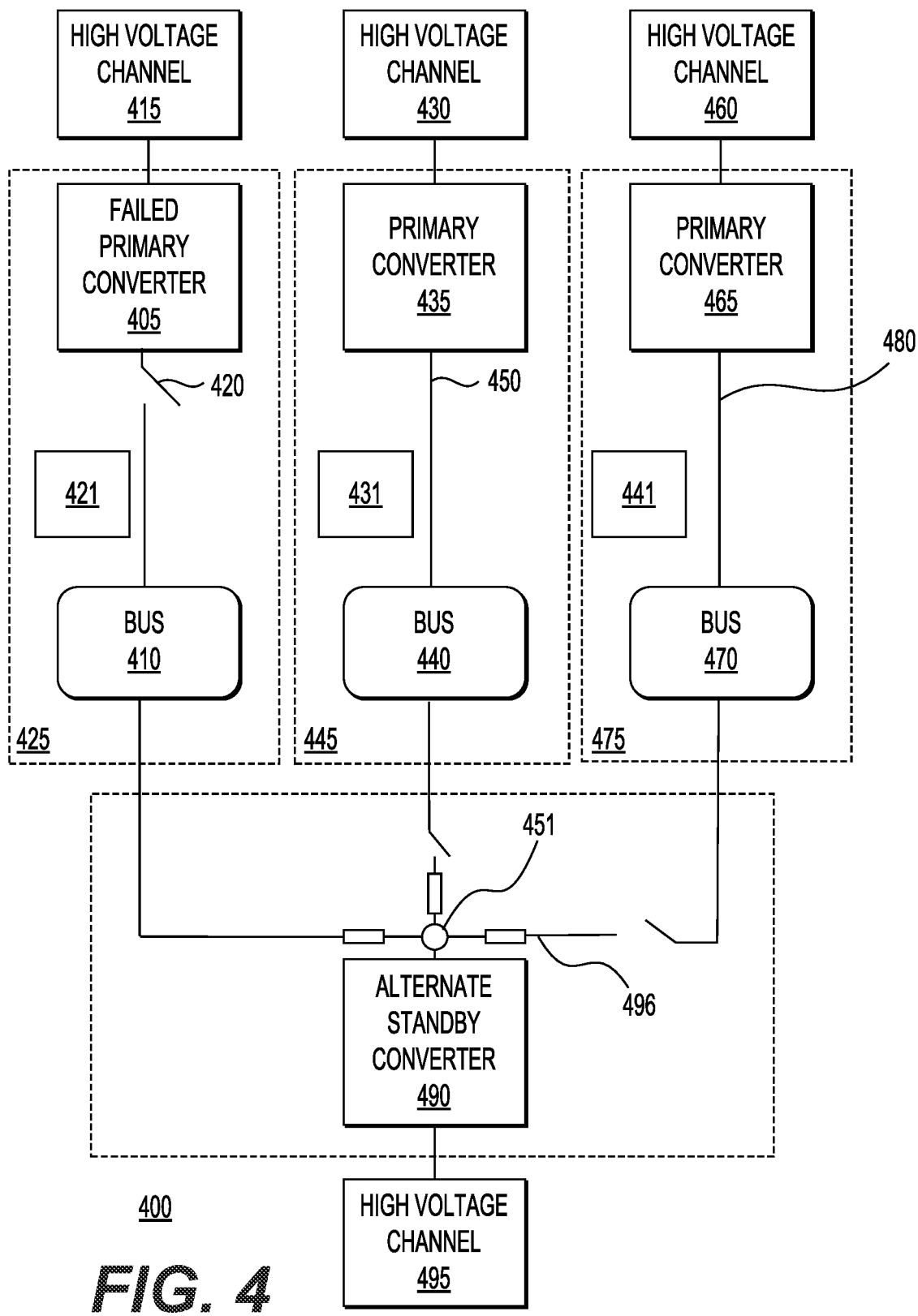
FIG. 4 shows another exemplary mode of an exemplary power distribution system, consistent with disclosed embodiments.

FIG. 4 shows another exemplary mode of an exemplary power distribution system 400, consistent with disclosed embodiments. As shown in FIG. 4, in some embodiments, the disclosed power distribution system 400 may comprise a first high voltage channel 415 connected to a first primary conversion device (e.g., primary converter) 405 which is in turn connected via a first switching network 420 to a first bus 410. As further shown in FIG. 4, the power distribution system 400 may further comprise a second high voltage channel 430 connected to a second primary conversion device (e.g., primary converter) 435 which is in turn connected via a second switching network 450 to a second bus 440. As further shown in FIG. 4, the power distribution system 400 may further comprise a third high voltage channel 460 connected to a third primary conversion device (e.g., primary converter) 465 which is in turn connected via a third switching network 480 to a third bus 470. As further shown in FIG. 4, the power distribution system 400 may further comprise a fourth high voltage channel 495 connected to an alternate/standby conversion device (e.g., alternate standby converter) 490 which is in turn connected via a fourth switching network 496 to each of buses 410, 440, and 470. As further shown in FIG. 4, a first power distribution block 425 may comprise at least the first switching network 420 and the first bus 410, a second power distribution block 445 may comprise at least the second switching network 450 and the second bus 440, and a third power distribution block 475 may comprise at least the third switching network 480 and the third bus 470. As further shown in FIG. 4, the second and third switching networks 450 and 480 may be configured such that the second and third primary power conversion devices 435 and 465 are separately and electrically connected to each of their respective buses 440 and 470, however the first primary power conversion device is a failed primary conversion device 405, and as a result, the first switching network 420 may be re-configured such that the first bus 410 is no longer electrically connected to the failed primary conversion device 405. As further shown in FIG. 4, the fourth switching network 496 may be configured such that the alternate power conversion device 490 is electrically connected only to the first bus 410. As a result, the first bus 410 may continue to receive power via the alternate conversion device 490 while simultaneously being electrically disconnected from the failing primary conversion device 405. As further shown in FIG. 4, a first controller 421 may control the first switching network 420, a second controller 431 may control the second switching network 450, a third controller 441 may control the third switching network 480, and an alternate controller 451 may control the fourth switching network 496. The fourth switching network 496 may include a first portion corresponding to the first power distribution block 425, a second portion corresponding to the second power distribution block 445, and a third portion corresponding to the third power distribution block 475. The first, second, and third portions of the fourth switching network 496 may each be controlled by the alternate controller 451.

Figure 5:
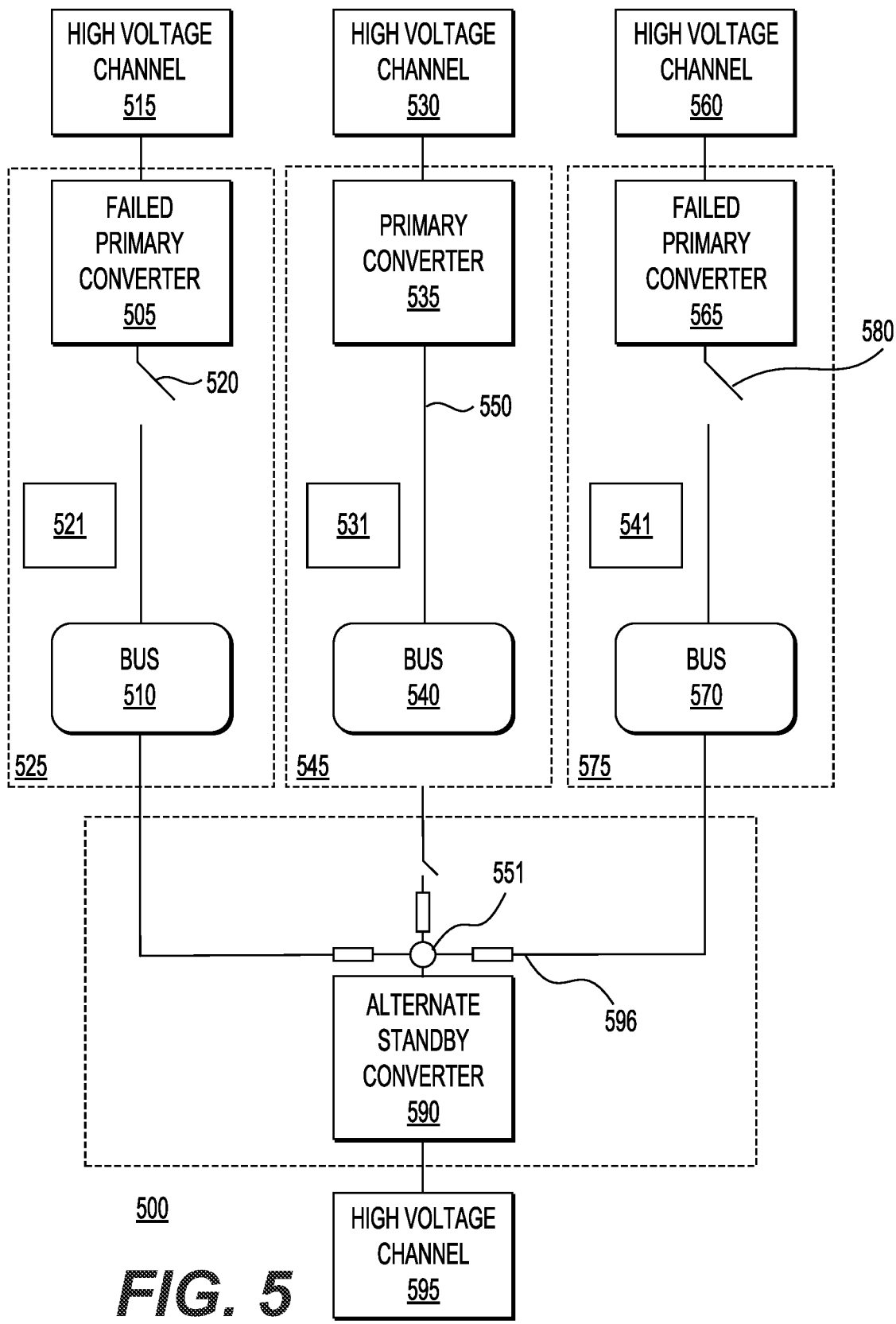
FIG. 5 shows yet another exemplary mode of an exemplary power distribution system, consistent with disclosed embodiments.

FIG. 5 shows yet another exemplary mode of an exemplary power distribution system 500, consistent with disclosed embodiments. As shown in FIG. 5, in some embodiments, the disclosed power distribution system 500 may comprise a first high voltage channel 515 connected to a first primary power conversion device (e.g., primary converter) 505 which is in turn connected via a first switching network 520 to a first bus 510. As further shown in FIG. 5, the power distribution system 500 may further comprise a second high voltage channel 530 connected to a second primary conversion device (e.g., primary converter) 535 which is in turn connected via a second switching network 550 to a second bus 540. As further shown in FIG. 5, the power distribution system 500 may further comprise a third high voltage channel 560 connected to a third primary conversion device (e.g., primary converter) 565 which is in turn connected via a third switching network 580 to a third bus 570. As further shown in FIG. 5, the power distribution system 500 may further comprise a fourth high voltage channel 595 connected to an alternate/standby power conversion device (e.g., alternate standby converter) 590 which is in turn connected via a fourth switching network 596 to each of buses 510, 540, and 570. As further shown in FIG. 5, a first power distribution block 525 may comprise at least the first switching network 520 and the first bus 510, a second power distribution block 545 may comprise at least the second switching network 550 and the second bus 540, and a third power distribution block 575 may comprise at least the third switching network 580 and the third bus 570. As further shown in FIG. 5, the second switching network 550 and 580 may be configured such that the second primary power conversion device 535 is separately and electrically connected to its respective bus 540, however the first primary power conversion device is a failed primary conversion device 505, and as a result, the first switching network 520 may be re-configured such that the first bus 510 is no longer electrically connected to the failed primary conversion device 405. Additionally, as further shown in FIG. 5, the third primary power conversion device is a failed primary conversion device 565, and as a result, the third switching network 580 may be further re-configured such that the third bus 570 is no longer electrically connected to the failed primary conversion device 565. As further shown in FIG. 5, the fourth switching network 596 may be configured such that the alternate power conversion device 590 is electrically connected to both the first bus 510 and the third bus 570. As a result, the first bus 510 and the third bus 570 each may continue to receive power via the alternate power conversion device 590 while simultaneously each of first bus 510 and third bus 570 may be electrically disconnected from the failing primary conversion devices 505 and 565. As further shown in FIG. 5, a first controller 521 may control the first switching network 520, a second controller 531 may control the second switching network 550, a third controller 541 may control the third switching network 580, and an alternate controller 551 may control the fourth switching network 596. The fourth switching network 596 may include a first portion corresponding to the first power distribution block 525, a second portion corresponding to the second power distribution block 545, and a third portion corresponding to the third power distribution block 575. The first, second, and third portions of the fourth switching network 596 may each be controlled by the alternate controller 551.

Figure 6:
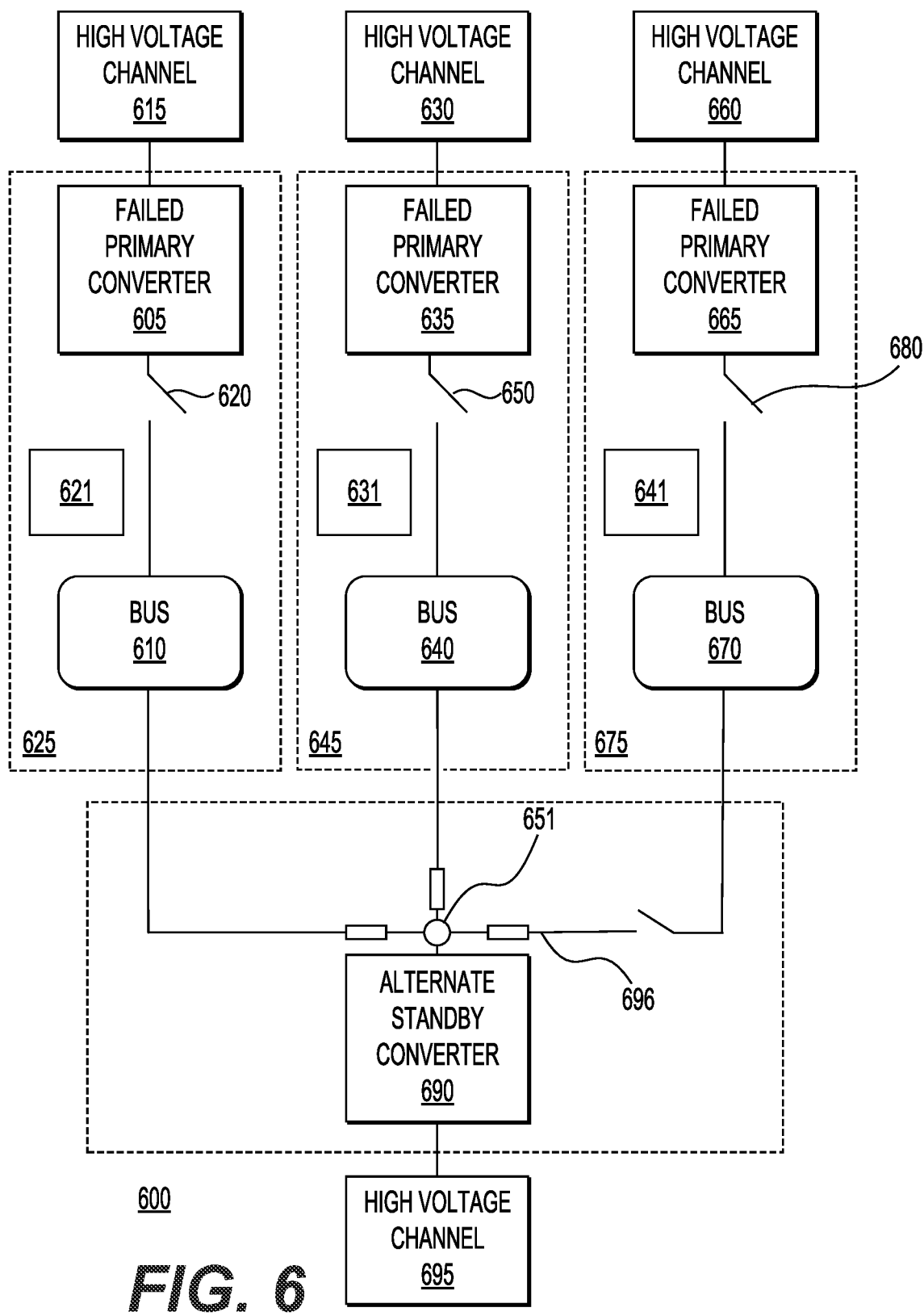
FIG. 6 shows yet another exemplary mode of an exemplary power distribution system, consistent with disclosed embodiments.

FIG. 6 shows yet another exemplary mode of an exemplary power distribution system 600, consistent with disclosed embodiments. As shown in FIG. 6, in some embodiments, the disclosed power distribution system 600 may comprise a first high voltage channel 615 connected to a first primary power conversion device (e.g., primary converter) 605 which is in turn connected via a first switching network 620 to a first bus 610. As further shown in FIG. 6, the power distribution system 600 may further comprise a second high voltage channel 630 connected to a second primary conversion device (e.g., primary converter) 635 which is in turn connected via a second switching network 650 to a second bus 640. As further shown in FIG. 6, the power distribution system 600 may further comprise a third high voltage channel 660 connected to a third primary conversion device (e.g., primary converter) 665 which is in turn connected via a third switching network 680 to a third bus 670. As further shown in FIG. 6, the power distribution system 600 may further comprise a fourth high voltage channel 695 connected to an alternate/standby power conversion device (e.g., alternate standby converter) 690 which is in turn connected via a fourth switching network 696 to each of buses 610, 640, and 670. As further shown in FIG. 6, a first power distribution block 625 may comprise at least the first switching network 620 and the first bus 610, a second power distribution block 645 may comprise at least the second switching network 650 and the second bus 640, and a third power distribution block 675 may comprise at least the third switching network 680 and the third bus 670. As further shown in FIG. 6, the first, second, and third primary power conversion devices are failed primary conversion devices 605, 635, and 665, and as a result, the first, second, and third switching networks 620, 650, and 680 may be re-configured such that the first, second, and third buses 610, 640, and 670 are no longer electrically connected to the failed primary conversion devices 605, 635, and 665. Additionally, as further shown in FIG. 6, the fourth switching network 696 may be configured such that the alternate power conversion device 690 is electrically connected to both the first bus 610 and the second bus 640. As a result, the first bus 610 and the second bus 640 each may continue to receive power via the alternate power conversion device 690 while simultaneously each of first bus 610, the second bus 640, and the third bus 670 may be electrically disconnected from the failing primary conversion devices 605, 635, and 665. As further shown in FIG. 6, a first controller 621 may control the first switching network 620, a second controller 631 may control the second switching network 650, a third controller 641 may control the third switching network 680, and an alternate controller 651 may control the fourth switching network 696. The fourth switching network 696 may include a first portion corresponding to the first power distribution block 625, a second portion corresponding to the second power distribution block 645, and a third portion corresponding to the third power distribution block 675. The first, second, and third portions of the fourth switching network 696 may each be controlled by the alternate controller 651.

Figure 7:
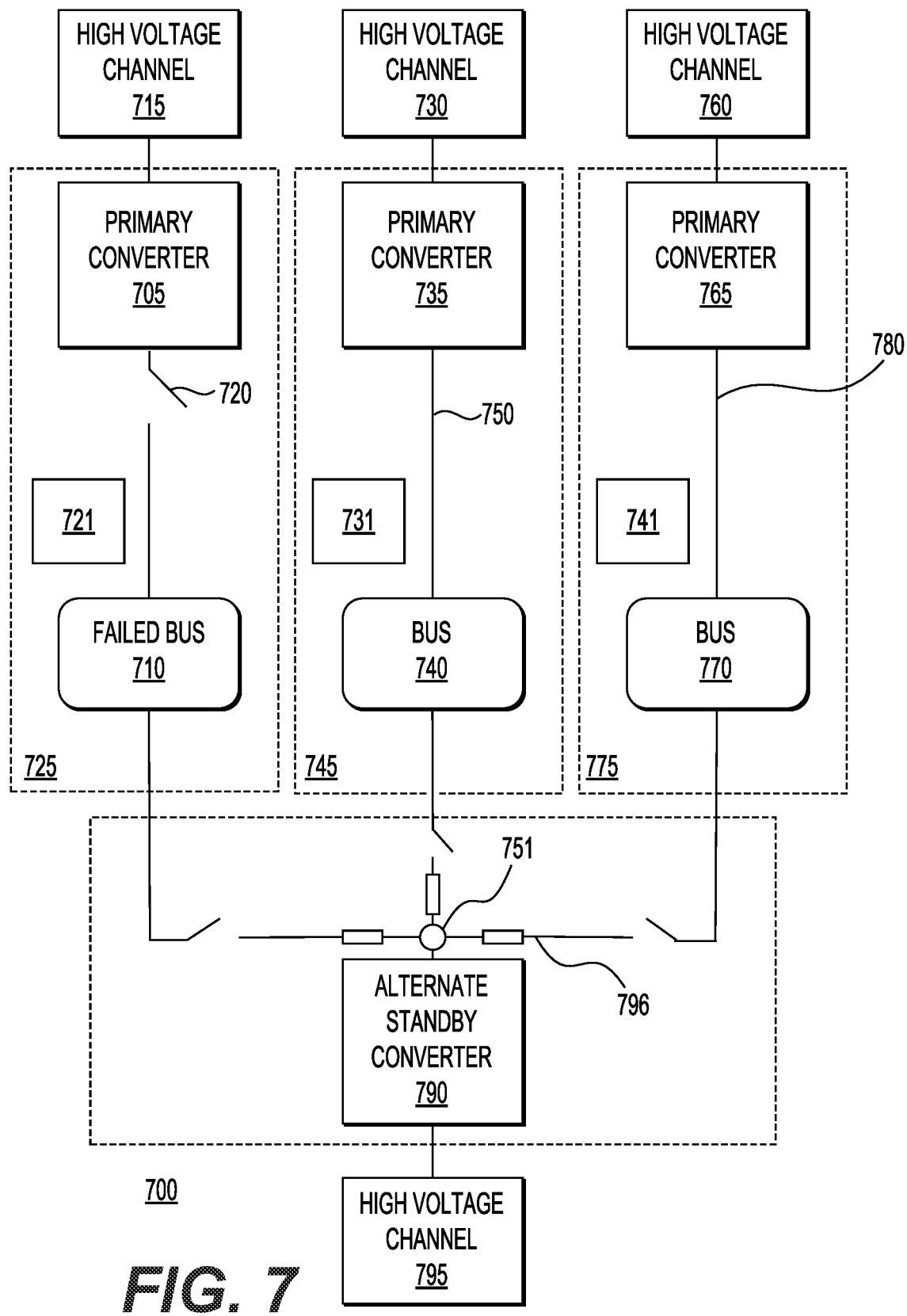
FIG. 7 shows yet another exemplary mode of an exemplary power distribution system, consistent with disclosed embodiments.

FIG. 7 shows yet another exemplary mode of an exemplary power distribution system 700, consistent with disclosed embodiments. As shown in FIG. 7, in some embodiments, the disclosed power distribution system 700 may comprise a first high voltage channel 715 connected to a first primary conversion device (e.g., primary converter) 705 which is in turn connected via a first switching network 720 to a first bus 710. As further shown in FIG. 7, the power distribution system 700 may further comprise a second high voltage channel 730 connected to a second primary conversion device (e.g., primary converter) 735 which is in turn connected via a second switching network 750 to a second bus 740. As further shown in FIG. 7, the power distribution system 700 may further comprise a third high voltage channel 760 connected to a third primary conversion device (e.g., primary converter) 765 which is in turn connected via a third switching network 780 to a third bus 770. As further shown in FIG. 7, the power distribution system 700 may further comprise a fourth high voltage channel 795 connected to an alternate/standby conversion device (e.g., alternate standby converter) 790 which is in turn connected via a fourth switching network 796 to each of buses 710, 740, and 770. As further shown in FIG. 7, a first power distribution block 725 may comprise at least the first switching network 720 and the first bus 710, a second power distribution block 745 may comprise at least the second switching network 750 and the second bus 740, and a third power distribution block 775 may comprise at least the third switching network 780 and the third bus 770. As further shown in FIG. 7, the second and third switching networks 750 and 780 may be configured such that the second and third primary power conversion devices 735 and 765 are separately and electrically connected to each of their respective buses 740 and 770; however, the first switching network 720 may be configured such that the first primary conversion device 705 is disconnected from a failing bus 710, and the fourth switching network 796 may be configured such that the alternate power conversion device 790 is not electrically connected to any of buses 710, 740, or 770. As a result, a minimum of two buses 740 and 770 remain operational while the failing bus 710 may be electrically disconnected from the power distribution system 700 in order to avoid propagation of issues associated with the failing bus 710. As further shown in FIG. 7, a first controller 721 may control the first switching network 720, a second controller 731 may control the second switching network 750, a third controller 741 may control the third switching network 780, and an alternate controller 751 may control the fourth switching network 796. The fourth switching network 796 may include a first portion corresponding to the first power distribution block 725, a second portion corresponding to the second power distribution block 745, and a third portion corresponding to the third power distribution block 775. The first, second, and third portions of the fourth switching network 796 may each be controlled by the alternate controller 751.

Figure 8:
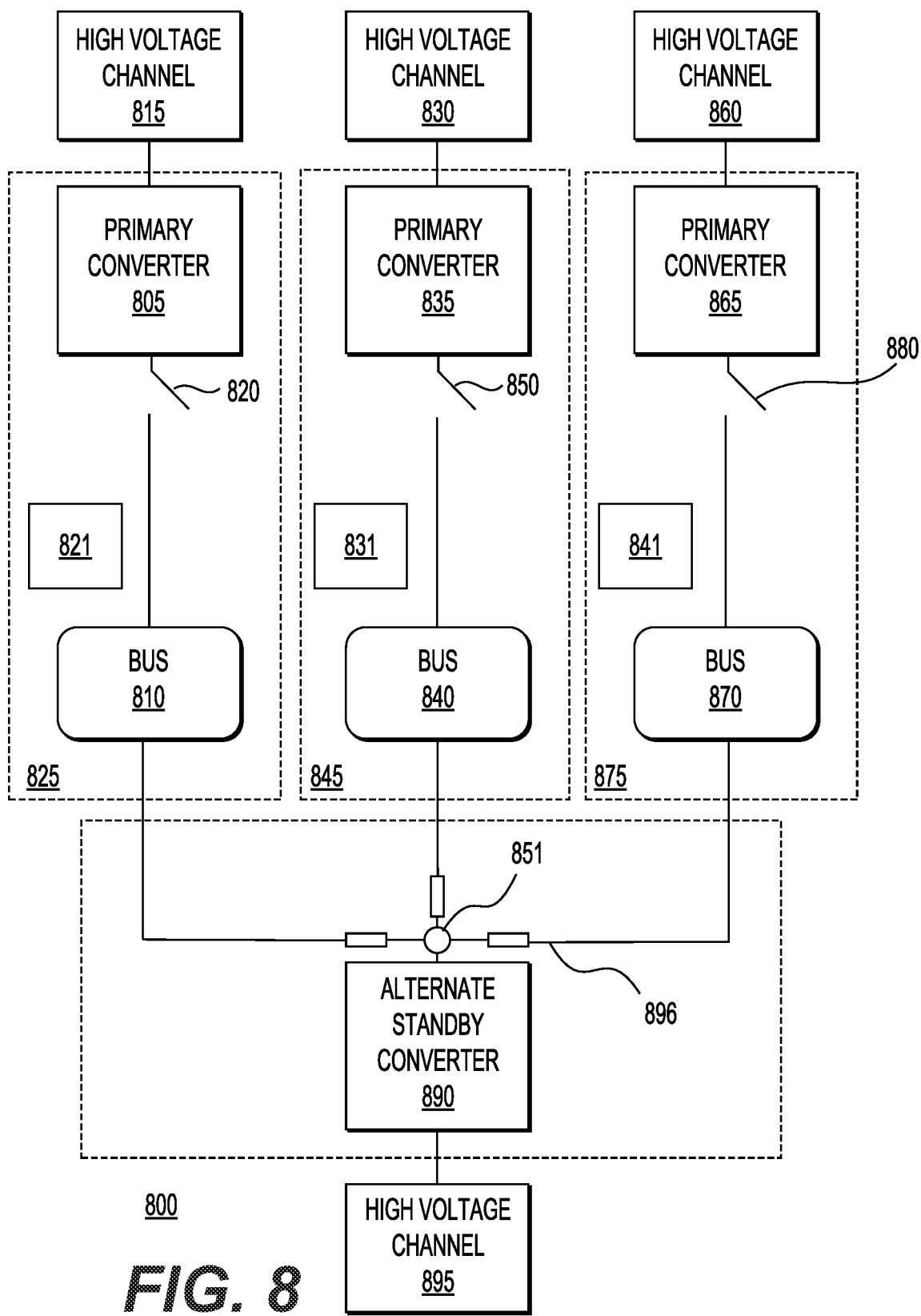
FIG. 8 shows yet another exemplary mode of an exemplary power distribution system, consistent with disclosed embodiments.

FIG. 8 shows yet another exemplary mode of an exemplary power distribution system 800, consistent with disclosed embodiments. As shown in FIG. 8, in some embodiments, the disclosed power distribution system 800 may comprise a first high voltage channel 815 connected to a first primary conversion device (e.g., primary converter) 805 which is in turn connected via a first switching network 820 to a first bus 810. As further shown in FIG. 8, the power distribution system 800 may further comprise a second high voltage channel 830 connected to a second primary conversion device (e.g., primary converter) 835 which is in turn connected via a second switching network 850 to a second bus 840. As further shown in FIG. 8, the power distribution system 800 may further comprise a third high voltage channel 860 connected to a third primary conversion device (e.g., primary converter) 865 which is in turn connected via a third switching network 880 to a third bus 870. As further shown in FIG. 8, the power distribution system 800 may further comprise a fourth high voltage channel 895 connected to an alternate/standby conversion device (e.g., alternate standby converter) 890 which is in turn connected via a fourth switching network 896 to each of buses 810, 840, and 870. As further shown in FIG. 8, a first power distribution block 825 may comprise at least the first switching network 820 and the first bus 810, a second power distribution block 845 may comprise at least the second switching network 850 and the second bus 840, and a third power distribution block 875 may comprise at least the third switching network 880 and the third bus 870. As further shown in FIG. 8, the first, second, and third switching networks 820, 850, and 880 may be configured such that the first, second, and third primary power conversion devices 805, 835, and 865 are electrically disconnected from each of their respective buses 810, 840, and 870, and the fourth switching network 896 may be configured such that the alternate power conversion device 890 is electrically connected to all of buses 810, 840, and 870. As a result, all three buses 810, 840, and 870 remain operational in, e.g., a standby or ground mode of the aircraft. As further shown in FIG. 8, a first controller 821 may control the first switching network 820, a second controller 831 may control the second switching network 850, a third controller 841 may control the third switching network 880, and an alternate controller 851 may control the fourth switching network 896. The fourth switching network 896 may include a first portion corresponding to the first power distribution block 825, a second portion corresponding to the second power distribution block 845, and a third portion corresponding to the third power distribution block 875. The first, second, and third portions of the fourth switching network 896 may each be controlled by the alternate controller 851.

Figure 9:
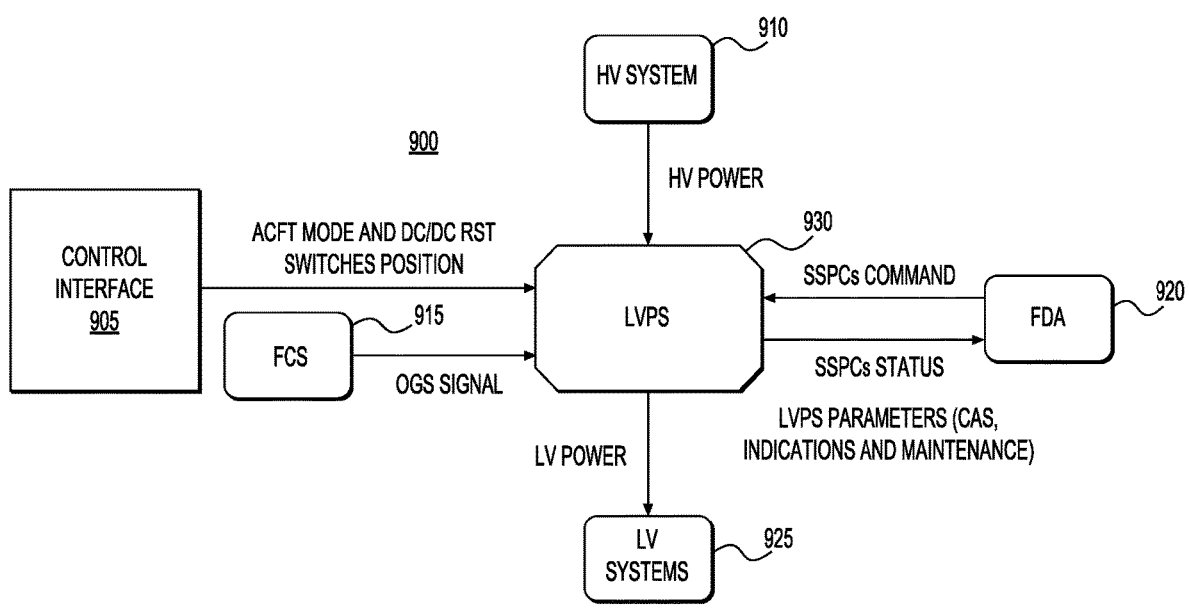
FIG. 9 shows an exemplary system for powering a low voltage power system, consistent with disclosed embodiments.

FIG. 9 shows an exemplary system 900 for powering a low voltage power system, consistent with disclosed embodiments. As shown in FIG. 9, a high voltage (HV) system 910 may provide high voltage (HV) power to the low voltage power system (LVPS) 930. As further shown in FIG. 9, a control interface 905 may provide information on aircraft mode and DC/DC reset and switch positions to the LVPS 930 which are used to control power up and power down of the aircraft and recover from DC/DC converter faults, respectively. As further shown in FIG. 9, the Flight Control System (FCS) 915 may provide an On Ground Stationary (OGS) signal to the LVPS 930 which is used by the controllers to avoid power down in flight. As further shown in FIG. 9, the Flight Deck Avionics (FDA) 920 may provide Solid State Power Controller(s) (SSPCs) commands to the LVPS 930 which are used to turn individual loads on and off, and the LVPS 930 may provide SSPCs statuses to the FDA 920. As further shown in FIG. 9, the LVPS 930 may provide low voltage (LV) power to LV systems 925 of the aircraft.

Figure 10:
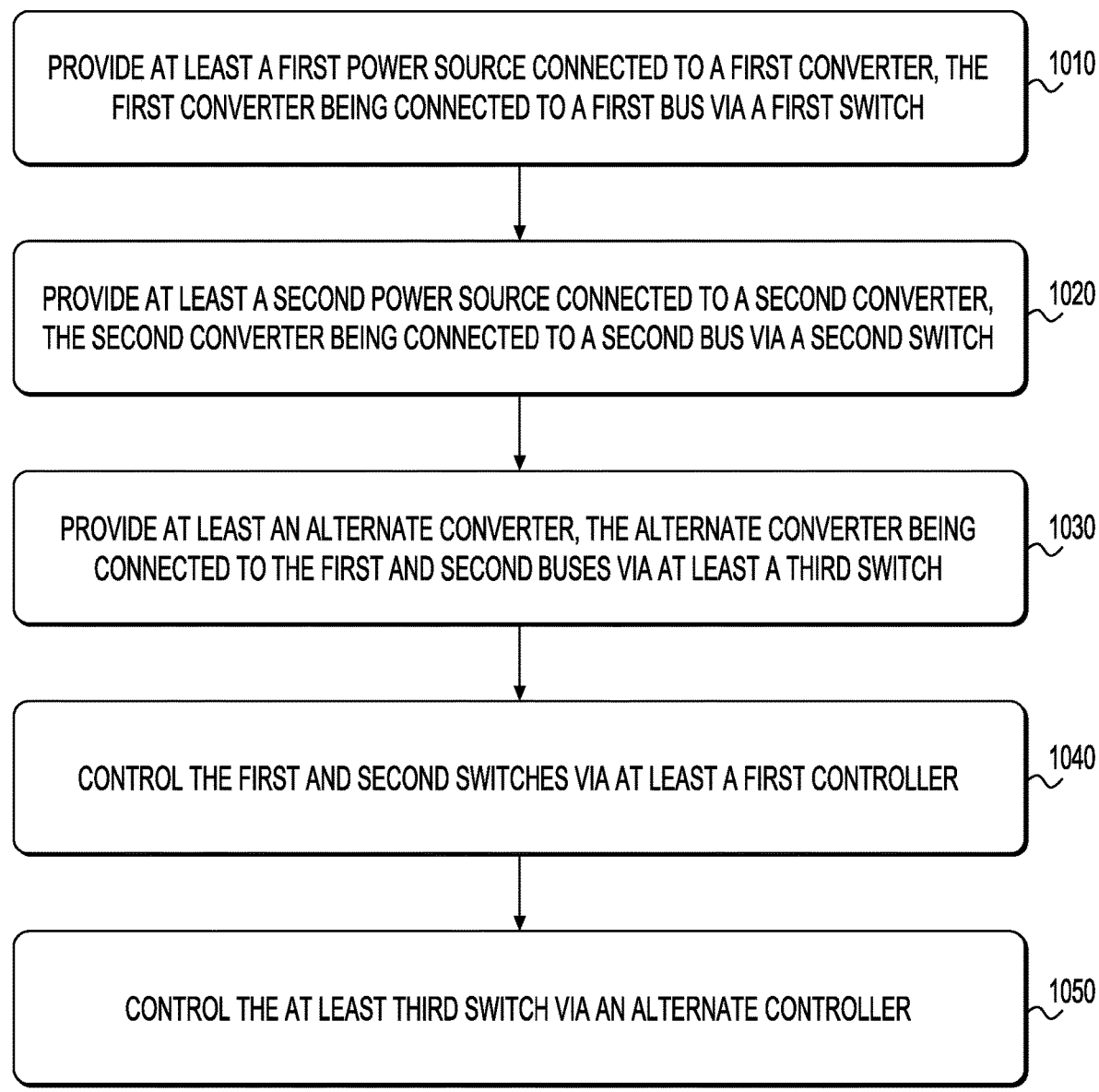
FIG. 10 shows an exemplary method for operating an exemplary power distribution system, consistent with disclosed embodiments.

FIG. 10 shows an exemplary method 1000 for operating an exemplary power distribution system, consistent with disclosed embodiments. At step 1010, the method 1000 may comprise providing at least a first power source (e.g., a high voltage power source) connected to a first power converter (e.g., a step-down low voltage converter), the first power converter being connected to a first bus (e.g., a low voltage bus) via a first switching device. At step 1020, the method 1000 may comprise providing at least a second power source (e.g., a high voltage power source) connected to a second power converter (e.g., a step-down low voltage converter), the second power converter being connected to a second bus (e.g., a low voltage bus) via a second switching device. At step 1030, the method 1000 may comprise providing at least an alternate power converter (e.g., a step-down low voltage converter), the alternate power converter being connected to the first and second buses via at least a third switching device. The first power converter, the first bus, and the first switching device may be electrically separate or electrically separable from the second power converter, second bus, and second switching device. Furthermore, the alternate power converter and at least third switching network may be electrically separate or electrically separable from both the first and second converters and switching devices. At step 1040, the method 1000 may comprise controlling the first and second switching devices via at least a first controller. At step 1050, the method 1000 may comprise controlling the at least third switching device via an alternate controller. As a result of the operation of the first and alternate controllers in controlling the first, second, and at least third switching devices, the power distribution system is configured to allow the alternate power converter to act as a backup power supply while also interrupting any connection to a failing component of the power distribution system.

Figure 11:
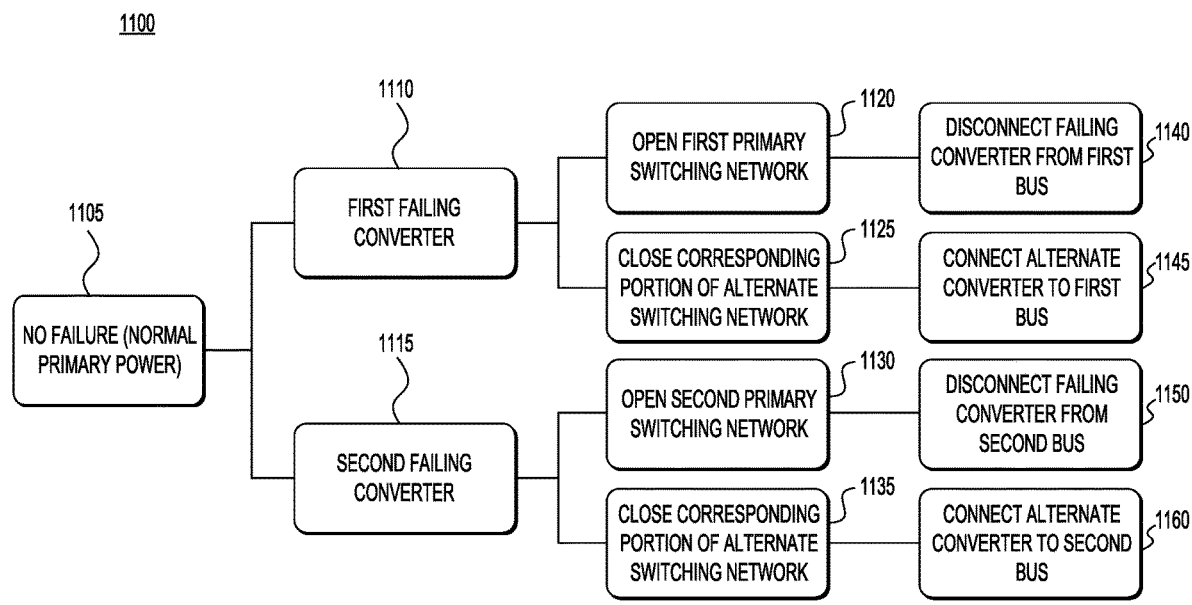
FIG. 11 shows another exemplary method for operating an exemplary power distribution system, consistent with disclosed embodiments.

FIG. 11 shows another exemplary method 1100 for operating, via primary and alternate controllers, an exemplary power distribution system, consistent with disclosed embodiments. At step 1105, the method 1100 may comprise operating with normal primary power without any failing power conversion devices. At step 1110, the method 1100 may comprise detecting a first failing primary power conversion device. At step 1120, the method 1100 may comprise opening a first primary switching network as controlled by a first controller in order to allow for step 1140, which may comprise disconnecting the first failing primary power conversion device from the first bus. At step 1125, the method 1100 may comprise closing a corresponding first portion of the alternate switching network as controlled by an alternate controller in order to allow for step 1145, which may comprise connecting the alternate power conversion device to the first bus. At step 1115, the method 1100 may comprise detecting a second failing primary power conversion device. At step 1130, the method 1100 may comprise opening a second primary switching network as controlled by a second controller in order to allow for step 1150, which may comprise disconnecting the second failing primary power conversion device from the second bus. At step 1135, the method 1100 may comprise closing a corresponding second portion of the alternate switching network as controlled by the alternate controller (or by a second alternate controller) in order to allow for step 1160, which may comprise connecting the alternate power conversion device to the second bus.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the inventions disclosed herein.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent to those skilled in the art from consideration of the specification and practice of the implementations disclosed herein. It is intended that the architectures and circuit arrangements shown in figures are only for illustrative purposes and are not intended to be limited to the specific arrangements and circuit arrangements as described and shown in the figures. It is also intended that the specification and examples be considered as exemplary only, with the true scope and spirit of the invention being indicated by the following claims.

The invention claimed is:

1. A power distribution system for an aircraft, comprising:
at least two power supplies, comprising:
a first power source connected to a first step-down converter, the first step-down converter being connected via a first switching device to a first bus, the first bus connecting the first switching device and an alternate switching device; and
a second power source connected to a second step-down converter, the second step-down converter being connected via a second switching device to a second bus, the second bus connecting the second switching device and the alternate switching device;
an alternate power supply comprising a third power source connected to an alternate step-down converter, the alternate step-down converter being connected to each of at least the first and second buses via the alternate switching device, the alternate power supply acting as a backup power supply configured to be used after a failure of one or more of the at least two power supplies;
wherein the first and second switching devices are controlled by at least a first controller; and
wherein the alternate switching device includes two or more switches controlled by an alternate controller.

2. The power distribution system of claim 1, wherein the system is configured to provide alternate power from the alternate power supply within 200 milliseconds after a component of the at least two power supplies fails.

3. The power distribution system of claim 1, wherein the system is configured to provide alternate power from the alternate power supply within 100 milliseconds after a component of the at least two power supplies fails.

4. The power distribution system of claim 1, wherein the system is configured to provide alternate power from the alternate power supply within 50 milliseconds after a component of the at least two power supplies fails.

5. The power distribution system of claim 1, wherein the first bus and the second bus are configured to receive power via the alternate switching device from the alternate power supply after a failure of a component of a channel corresponding to at least one of the first power source or the second power source.

6. The power distribution system of claim 1, wherein each one of the first, second, and alternate switching devices has a conducting state and a non-conducting state, wherein the at least first controller and the alternate controller are configured to cause transitions within each of the first, second, and alternate switching devices between their conducting states and their non-conducting states to thereby cause each of the first, second, and alternate power supplies to provide power to each of the first and second buses in different arrangements.

7. The power distribution system of claim 1, wherein the first, second, and alternate switching devices are configured such that each of the first, second, and alternate step-down converters are electrically separate or electrically separable.

8. The power distribution system of claim 1, wherein the first, second, and alternate power sources are high voltage power sources.

9. The power distribution system of claim 1, wherein the first, second, and alternate step-down converters are high voltage to low voltage converters.

10. The power distribution system of claim 1, wherein the first and second buses are configured to be interconnectable.

11. The power distribution system of claim 1, wherein the first and second switching devices are configured to disconnect a failing component of a channel corresponding to at least one of the first power source or the second power source from the first bus or the second bus.

12. The power distribution system of claim 1, wherein the first, second, and alternate step-down converters are DC-DC converters.

13. The power distribution system of claim 1, wherein the first switching device is controlled by the at least first controller and the second switching device is controlled by at least a second controller.

14. The power distribution system of claim 1, wherein the alternate switching device includes three or more switching devices.

15. The power distribution system of claim 1, wherein the third power source is one of the first power source or the second power source.

16. The power distribution system of claim 1, wherein the first, second, and third power sources are the same power source.

17. The power distribution system of claim 1, wherein the first, second, and alternate step-down converters operate in an absence of a low voltage battery.

18. The power distribution system of claim 1, wherein the at least first controller operates based on hardwire logic.

19. The power distribution system of claim 1, wherein the alternate controller operates based on conditional logic.

20. A method for distributing power in an aircraft, comprising:
providing at least two power supplies, comprising:
a first power source connected to a first step-down converter, the first step-down converter being connected via a first switching device to a first bus, the first bus connecting the first switching device and an alternate switching device; and
a second power source connected to a second step-down converter, the second step-down converter being connected via a second switching device to a second bus, the second bus connecting the second switching device and the alternate switching device;
providing an alternate power supply comprising a third power source connected to an alternate step-down converter, the alternate step-down converter being connected to each of at least the first and second buses via the alternate switching device, the alternate power supply acting as a backup power supply configured to be used after a failure of one or more of the at least two power supplies;
controlling the first and second switching devices by at least a first controller; and
controlling the alternate switching device by an alternate controller, the alternate switching device including two or more switches.

21. The power distribution system of claim 1, wherein:
a first switch of the alternate switching device is configured to connect the alternate power supply to the first bus;
a second switch of the alternate switching device is configured to disconnect the second bus from the alternate power supply; and
the first switching device is configured to disconnect the first step-down converter from the first bus.

22. The power distribution system of claim 1, wherein:
the first bus, the first switching device, and the alternate switching device are connected in series; and
the second bus, the second switching device, and the alternate switching device are connected in series.

* * * * *